United States Patent [19]

Kurihara

[11] Patent Number: 4,906,152
[45] Date of Patent: Mar. 6, 1990

[54] SCREW RETAINER

[75] Inventor: Kazumasa Kurihara, Utsunomiya, Japan

[73] Assignee: Nifco, Inc., Yokohama, Japan

[21] Appl. No.: 207,585

[22] Filed: Jun. 16, 1988

[30] Foreign Application Priority Data

Jun. 30, 1987 [JP] Japan ............................ 62-99289[U]

[51] Int. Cl.[4] .......................................... F16B 37/04
[52] U.S. Cl. .............................. 411/182; 174/138 D; 411/349; 411/508; 411/913
[58] Field of Search ........ 411/175, 182, 349, 508–510, 411/512, 549, 553, 908, 913, 15, 60; 24/290, 292, 297, 590, 685; 174/138 D

[56] References Cited

U.S. PATENT DOCUMENTS

| | | | |
|---|---|---|---|
| 3,220,078 | 11/1965 | Preziosi | 411/349 |
| 3,588,968 | 6/1971 | Heilman | 411/349 X |
| 4,077,300 | 3/1978 | Yoda | 411/913 X |
| 4,285,103 | 8/1981 | Inamoto | 411/508 |
| 4,422,222 | 12/1983 | Notoya | 24/297 X |
| 4,668,145 | 5/1987 | Hirohata | 411/508 |
| 4,704,059 | 11/1987 | Nakama et al. | 411/913 X |
| 4,726,722 | 2/1988 | Wollar | 411/508 X |
| 4,743,152 | 5/1988 | Nakayama et al. | 411/913 X |

FOREIGN PATENT DOCUMENTS

| | | | |
|---|---|---|---|
| 1342218 | 9/1962 | France | 411/508 |
| 1319961 | 6/1973 | United Kingdom | 411/509 |

*Primary Examiner*—Lloyd A. Gall
*Attorney, Agent, or Firm*—Schwartz & Weinrieb

[57] ABSTRACT

A screw retainer comprises a head portion, and a leg portion depending therefrom and provided with locking means, a screw retainer bore being formed so as to extend from the top of the head portion through the head and leg portions. An engagement portion projects from the upper surface of the head portion such that the screw retainer bore is open at the top of the engagement portion. The top of the engagement portion is provided with temporary engagment pawls for engaging an upper surface of a panel to be secured to a base panel within which the screw retainer is disposed by means of its dependent leg portion.

10 Claims, 2 Drawing Sheets

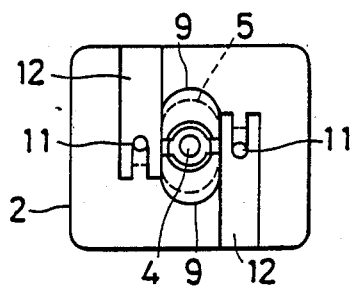
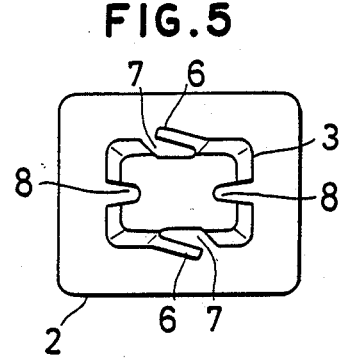
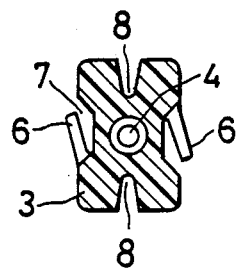
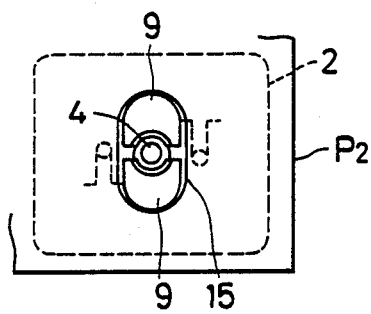
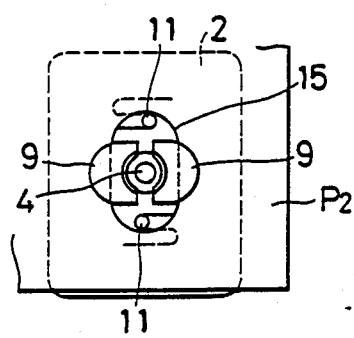
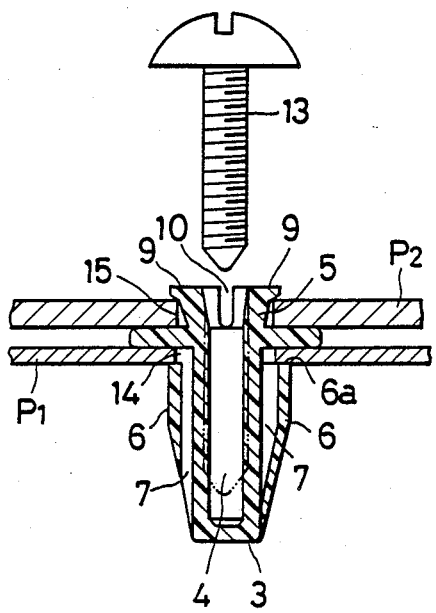

SCREW RETAINER

BACKGROUND OF THE INVENTION

1. Field of the Invention

This invention relates to a screw retainer for retaining a screw when securing a panel to a metal panel or the like in an overlapped state or when securing a component to a metal panel or the like. More particularly, the invention concerns a screw retainer which is to be temporarily fitted within a panel or component being secured to a metal panel or the like, thus improving the operability of its mounting within a mounting hole formed within the panel or compound to be secured to the metal panel or the like.

2. Description of the Prior Art

Screw retainers made of synthetic resin plastic are well known in the art as a means for securing screws to a metal panel or the like unsuitable for direct driving of a screw therein. Such a screw retainer typically has a flange-like head portion, a leg portion depending from the head portion, and a screw retainer before extending from the top of the head portion through the head and leg portions. In the use of this screw retainer, the leg portion is preliminarily inserted through and fitted within a mounting hole formed within a base panel to which a panel or a component is to be mounted, then the panel or component is set on top of the head portion of the screw retainer, and a screw is driven through a hole formed within the panel or component into the screw receiving bore, so that the panel or component is secured to the base panel.

With this prior art screw retainer, the leg portion is spread by means of the screw threadedly engaged within the screw receiving bore. Thus, the securement of the screw itself is enhanced, and the securement of the screw retainer within the base panel is also enhanced. A stable mounting of a panel or component upon the base panel can thus be obtained. For these reasons, the screw retainer described above is extensively utilized as a means for securing components to metal panels or the like.

With this prior art screw retainer, however, a component or the like to be secured is set on top of the head portion, and the screw is inserted through a hole formed within the component into the screw retainer bore of the screw retainer. Therefore, when the mounting of the screw retainer, with the leg portion thereof preliminarily inserted within a mounting hole of the base panel, has been completed, the location of the screw retainer bore is now out of sight because of the presence of the component to be secured, thus requiring much time for performance of the screwing operation of the screw. Particularly, when securing an elongate panel to the base panel using a plurality of screw retainers, the positions of the screw retainers are concealed by means of the elongate panel, making the screwing operation inconvenient or cumbersome.

OBJECT OF THE INVENTION

The present invention has been accomplished in view of the problems exhibited by means of the prior art screw retainer described above, that is, the inferior operability due to lack of positional guidance caused by preliminary insertion and fitting of the leg portion of the screw retainer within a base panel, and its object is to provide a screw retainer by means of which a component or the like, to which the screw retainer is secured, can be preliminarily temporarily secured to the base panel as a result of the fitting of the leg portion of the screw retainer within a mounting hole of the base panel so that the position of the screw retainer bore defined within the screw retainer can be ascertained from the front side of the component or the like, the leg portion of the screw retainer then being inserted within the mounting hole of the base panel so that the screw can be threadedly engaged within the screw retainer bore.

SUMMARY OF THE INVENTION

To attain the above object of the invention, there is provided a screw retainer which comprises a head portion and a leg portion depending therefrom and provided with locking means, a screw retainer bore being formed so as to extend from the top of the head portion through the head and leg portions and an engage portion projecting from the top of the head portion, the screw retainer bore being open at the top of the engagement portion and the top of the engagement portion being provided with temporary engagement pawls.

In the use of the screw retainer having the above construction, the engagement portion projecting from the top of the head portion is inserted within a through hole formed within a component or the like to be secured to the base panel, and engagement pawls of the engagement portion for temporary securement of the screw retainer within the component or the like are engaged with the edges of the through hole of the component or the like, whereby the screw retainer is temporarily secured to the back of the component or the like. Then, the leg portion of the screw retainer is inserted into a mounting hole provided within the base panel, and the screw is threadedly engaged within the screw retainer bore through the engagement portion, the head portion, and the leg portion, whereby the component of the like is secured to the base panel.

As has been shown, the screw retainer according to the invention is mounted upon the base panel while being temporarily secured to the back side of the component or the like to be secured to the base panel. Thus, the mounting operation can be facilitated, and the operability of the retainer is improved.

BRIEF DESCRIPTION OF THE DRAWINGS

The above and other objects and features of the invention will become more apparent from the following detailed description with reference to the accompanying drawings, wherein:

FIG. 4 is a plan view showing the screw retainer of FIG. 1;

FIG. 5 is a bottom view showing the screw retainer of FIG. 1;

FIG. 6 is a sectional view taken along line VI—VI in FIG. 3;

FIG. 7 is a plan view showing the screw retainer of FIG. 1 in a state aligned with a through hole formed within a component to be secured;

FIG. 8 is a plan view showing the screw retainer of FIG. 1 in a state mounted within the through hole of the component; and FIG. 9 is a longitudinal sectional view showing a state in which the screw retainer having been mounted within the through hole of the component of FIG. 8 is inserted within a mounting hole of a base panel and temporarily secured to the base panel.

DETAILED DESCRIPTION OF THE PREFERRED EMBODIMENT

Figure 1:
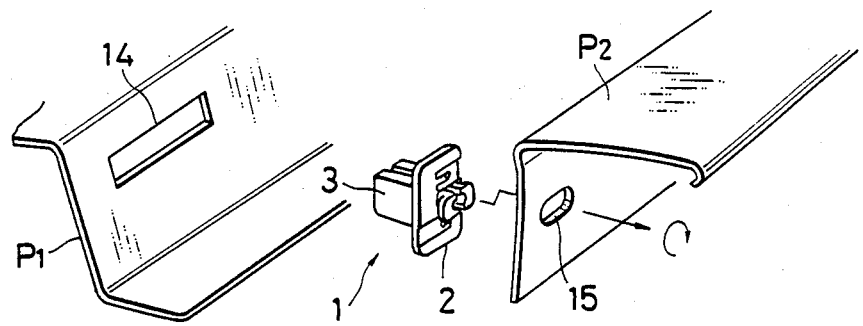
FIG. 1 is a perspective view showing an embodiment of the screw retainer as it is intended to be used according to the invention for securing two panels or the like together.
Figure 2:
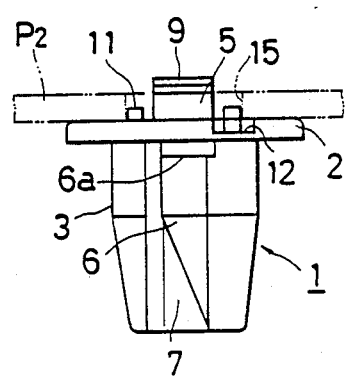
FIG. 2 is a front view showing the screw retainer of FIG. 1.
Figure 3:
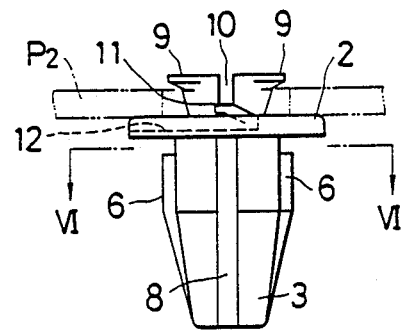
FIG. 3 is a side view showing the screw retainer of FIG. 1.

Referring to the Figures, there is shown a screw retainer 1 according to the invention. The screw retainer 1 is a one-piece molding of a thermoplastic synthetic resin. It has a flange-like head portion 2, a leg portion 3 depending therefrom and a cylindrical engagement portion 5 projecting from the upper surface of the head portion 2. A screw retainer bore 4 extends through the engagement portion 5 from the open end thereof and through the head and leg portions.

The leg portion 3 has a substantially rectangular sectional profile in conformity to the mounting hole 14 of a panel P1, and its two long sides, that is, the front and rear sides, are provided with engagement pieces 6 for engaging with the undersurface portion of panel P1.

The engagement pieces 6 are each formed so as to extend like a sector from one edge of a groove 7 formed in the longitudinal direction within each of the two long sides or surfaces of the leg portion. Normally, a free end portion of each of the pieces 6 extends from the groove 7, and an engagement portion 6a at the upper end projects from the surface of the leg portion 3 and faces the lower surfaces of the head portion 2. The leg portion 3 is formed such that its diameter is progressively reduced toward the free end thereof so as to facilitate its insertion into the mounting hole 14. The opposite sides of the leg portion are formed with respective central longitudinal slits 8. In addition, a lower half portion of each engagement piece 6 is notched obliquely so as to facilitate the insertion of the leg portion.

The head portion 2 serves to restrict the extent of insertion of the leg portion 3 into the mounting hole 14 and also serves as a base for supporting a component to be secured to the panel P1, that is, an elongate panel P2 in this example. It has the shape of a rectangular plate in conformity to the sectional shape of the leg portion 3.

The cylindrical engagement portion 5 is inserted through a through hole 15 formed within the component to be secured to the panel P1, that is, the panel P2. The top of portion 5 is provided with a pair of temporary engagement pawls 9 for engagement with the edge of the through hole 15 and the upper surface of panel P2.

The engagement portion 5 in this embodiment is substantially cylindrical and is divided into two portions by means of a longitudinal slit 10 formed within the top end, one engagement pawl 9 projecting from the top of each of the two divisions.

Reference numeral 11 designates a pair of engagement projections provided upon the upper surface of the head portion 2 upon opposite sides of the engagement portion 5. One engagement projection 11 extends upwardly from each groove 12 formed within the upper surface of the head portion 2. Normally, each engagement projection 11 has an upper end projecting from the top surface of the head portion, and the upper end can be depressed into the groove 12 by means of a downward biasing force.

The through hole 15 formed within the panel P2 is an oval hole extending in the lengthwise direction of the panel. The screw retainer can be inserted through the hole 15 when the orientation of the engagement pawls 9 is aligned with the lengthwise direction of the panel. By turning the screw retainer through an angle of 90 degrees after its insertion within hole 15, the engagement portion 5 is engaged within the hole 15 with the engagement pawls 9 engaged with the hole edge and the upper surface at the panel P2. The mounting hole 14 formed within the base panel P1 is rectangular in configuration and elongated in the lengthwise direction of the through hole 15.

The screw retainer according to the invention has the above construction. When securing the panel P2 to the base panel P1, the screw retainer is inserted from the back side of the panel P2 with the engagement portion 5 and the orientation of the engagement pawls 9 thereof appropriately aligned with the hole 15. When the screw retainer has been inserted until the upper surface of the head portion 2 strikes the undersurface of panel P2, the screw retainer is turned through an angle of 90 degrees, thereby engaging the engagement pawls 9 with the long edges of the hole 15 and the upper surface of the panel P2, so that the screw retainer is temporarily secured within panel P2. In order to obtain a firm state of engagement of the engagement pawls 9 with respect to panel P2, the outer diameter of the engagement portion 5 may be set to be slightly greater than the smaller diameter of the through hole 15.

Since the engagement pawls 9 are engaged with the edges of the through hole 15 by the 90-degree rotation, the screw retainer 1 extends or projects outwardly from the back side of the panel P2. With the 90-degree rotation noted above, the engagement projections 11 provided upon the upper surface of the head portion 2 enter the through hole 15 and float as shown in FIG. 8. Thus, the screw retainer is restricted against rotation, and stable temporary securement can be obtained.

After the screw retainer has been temporarily secured in the above manner, the panel P2 is moved toward the surface of the base panel P1, and the leg portion 3 of the screw retainer is pushed into the mounting hole 14 of panel P1. As a result, the engagement pieces 6 are caused to engage with the edges of the mount hole 14 and the undersurface portions of the panel P1, so that the panel P2 is secured to the base panel P1 by means of the screw retainer. Subsequently, a set screw 13 is threadedly engaged within the screw retainer bore 4 extending downwardly from the upper end of the engagement portion 5 projecting from the front surface of the panel P2. As a result, the engagement portion 5 and engagement legs 3 engaged within the mounting hole 14 of panel P1 are spread radially outwardly. The engagement of the screw retainer within the mounting hole 14 is thus reinforced, so that the panel P2 is firmly secured to the base panel P1.

While an embodiment of the invention has been described with respect to its construction and manner of use, with the screw retainer according to the invention the engagement portion can be preliminarily temporarily secured to the back side of a component of the like to be secured to the base panel. By disposing the component or the like such that it faces the base panel and wherein the leg portion is aligned with the mounting hole of panel P1, as a result of a subsequent pushing of the component or the like, the leg portion of the screw retainer can be easily inserted into the mounting hole of panel P1. Thus, with the screw retainer according to the invention, it is possible to attain a speedy mounting operation without any of the difficulty encountered with the prior art screw retainers, particularly in such cases as when securing a large-sized component to the base panel, wherein such conventional retainers normally make it difficult to locate the position of the screw retainer preliminarily mounted within the mounting hole of the base panel, or when securing a single component using a plurality of screw retainers. Furthermore, with the screw retainer constructed according to the invention the screw retainer bore defined within the engagement portion faces the surface of the component or the like to be secured within the base panel P1, so that the operation of threading a screw within the screw retainer bore is further facilitated, which is very advantageous when the screw retainer is used during a car assembly process.

Furthermore, when securing a single component with a plurality of screw retainers, by forming elongate holes as the mounting holes and through holes such that the longitudinal direction of these holes is aligned with the direction of the array of the screw retainers as in the above embodiment, it is conveniently possible to absorb errors in the mounting position of any particular screw retainer as a result of the length of the holes. Still further, the screw retainer can be utilized in normal state at all times, so that it is possible to expect firm securement properties.

Yet further, while in the above embodiment the engagement portion is cylindrical and is divided into two divisions by means of a longitudinal slit, the sectional profile of the engagement portion may be rectangular. In addition, it is possible to provide a plurality of projections around the open end of the screw retainer bore, each projection having an outwardly directed engagement pawl provided at the upper end thereof.

Obviously, many modifications and variations of the present invention are possible in light of the above teachings. It is therefore to be understood that within the scope of the appended claims, the present invention may be practiced otherwise than as specifically described herein.

What is claimed is:

1. A screw retainer for securing two panels together, comprising:
   a head portion having a predetermined diametrical extent, undersurface means for engagement with an upper surface portion of a first one of said two panels, and upper surface means for engagement with an undersurface portion of a second one of said two panels;
   an engagement portion projecting from the top of said head portion, and having a diametrical extend which is less than that of said head portion, for disposition through hole means defined within said second one of said two panels in a direction extending from said undersurface portion of said second one of said two panels to an upper surface portion of said second one of said two panels such that locking means thereon engage said upper surface portion of said second one of said two panels so as to secure said screw retainer within said second one of said two panels;
   a leg portion depending from said head portion for disposition through hole means defined within said first one of said two panels in a direction extending from said upper surface portion of said first one of said two panels to an undersurface portion of said first one of said two panels and provided with flexible, snap-fitting locking means for engaging said undersurface portion of said first one of said two panels so as to secure said screw retainer within said first one of said two panels;
   a screw retainer bore defined within said screw retainer so as to extend from the top of said engagement portion through said head and leg portions for receiving a threaded bolt which when inserted within said screw retainer bore radially expands said engagement portion and said leg portion into engagement with sidewall portions of said hole means defined within said first and second panels for securing said screw retainer within said two panels and for securing said two panels together;
   said hole means defined within said second one of said two panels has an elongated configuration with a first large diametrical extent extending in a first direction, and a second smaller diametrical extent extending in a second direction perpendicular to said first direction;
   said engagement portion, including said locking means thereof, has an elongated configuration with a first large diametrical extent extending in a first direction, and a second small diametrical extent extending in a second direction perpendicular to said first direction, and wherein said first diametrical extent of said engagement portion locking means is less than said first diametrical extent of said hole means yet larger than said second diametrical extent of said hole means such that said engagement portion can be mounted within said hole means of said second one of said two panels by means of a rotational locking movement wherein said first diametrical extent of said emgagement means is aligned with said first diametrical extent of said hole means, and after insertion of said engagement portion locking means through said hole means, said engagement portion is rotated 90° so as to align said first diametrical extent thereof with said second diametrical extent of said hole means; and
   upstanding projections disposed upon said upper surface means of said head portion for engagement with said hole means of said second one of said two panels so as to prevent further rotation of said screw retainer relative to said second one of said two panels beyond said 90° rotational movement.

2. A screw retainer as set forth in claim 1, wherein:
   said engagement portion is integrally attached to and projects upwardly from said upper surface means of said head portion; and
   said leg portion is integrally attached to and depends downwardly from said undersurface means of said head portion.

3. A screw retainer as set forth in claim 1, wherein:
   said upstanding projections comprises a pair of projections disposed upon opposite sides of said engagement portion for engaging opposite sidewall portions of said hole means of said second one of said two panels.

4. The screw retainer according to claim 1, wherein said engagement portion is cylindrical.

5. The screw retainer according to claim 1, wherein said engagement portion is cylindrical and has a plurality of longitudinal slits extending downwardly from the top thereof.

6. A screw retainer as set forth in claim 1, wherein:
said screw retainer comprises a one-piece molding fabricated from a thermoplastic synthetic resin material.

7. A screw retainer as set forth in claim 1, wherein:
said locking means of said engagement portion comprise locking pawls.

8. A screw retainer as set forth in claim 5, wherein:
said locking means of said engagement portion comprises a plurality of pawls wherein one pawl is integrally formed with each section of said engagement portion defined by said longitudinal slits.

9. A screw retainer as set forth in claim 1, wherein:
said leg portion has a substantially rectangular configuration in cross-section; and
said locking means thereof comprise leaf-type engagement pieces mounted in a cantilevered manner so as to project outwardly from long side portions of said substantially rectangular leg portion of said retainer.

10. A screw retainer as set forth in claim 1, wherein:
a lower end portion of said leg portion is tapered radially inwardly so as to facilitate insertion of said leg portion within said hole means defined within said first one of said two panels.

* * * * *